United States Patent [19]
Laitinen

[11] Patent Number: 5,383,371
[45] Date of Patent: Jan. 24, 1995

[54] METHOD AND DEVICE FOR MEASUREMENT OF THE NIP FORCE AND/OR NIP PRESSURE IN A NIP FORMED BY A REVOLVING ROLL OR A BAND THAT IS USED IN THE MANUFACTURE OF PAPER

[75] Inventor: Jyrki Laitinen, Jyväskylä, Finland

[73] Assignee: Valmet Paper Machinery, Incorporated, Helsinki, Finland

[21] Appl. No.: 960,725

[22] Filed: Oct. 14, 1992

[30] Foreign Application Priority Data

Oct. 14, 1991 [FI] Finland .................................. 914829

[51] Int. Cl.$^6$ .............................................. G01L 5/00
[52] U.S. Cl. .................................. 73/862.55; 73/862.68
[58] Field of Search .......... 73/862.55, 862.68, DIG. 4; 310/800

[56] References Cited

U.S. PATENT DOCUMENTS

| | | | |
|---|---|---|---|
| 3,631,385 | 12/1971 | Silverman | 73/603 |
| 3,962,911 | 6/1976 | Grenlund | 73/862.55 |
| 4,016,756 | 4/1977 | Kunkle | 73/862.55 |
| 4,373,533 | 2/1983 | Iinuma | 73/625 |
| 4,693,196 | 9/1987 | Hager | 112/273 |
| 4,744,253 | 5/1988 | Hermkens | 73/862.55 |
| 4,791,863 | 12/1988 | Vähätalo | 100/35 |
| 5,048,353 | 9/1991 | Justus | 73/862.55 |
| 5,060,651 | 10/1991 | Kondo et al. | 73/625 |
| 5,159,402 | 10/1992 | Ortiz, Jr. | 356/237 |

FOREIGN PATENT DOCUMENTS

| | | | |
|---|---|---|---|
| 0219149 | 4/1987 | European Pat. Off. | |
| 0021189 | 6/1977 | Japan | 310/800 |
| 0015533 | 1/1985 | Japan | 73/862.55 |
| 0015534 | 1/1985 | Japan | 73/862.55 |
| 0015535 | 1/1985 | Japan | 73/862.55 |
| 91/13337 | 9/1991 | WIPO | |

*Primary Examiner*—Tom Noland
*Assistant Examiner*—Daniel S. Larkin
*Attorney, Agent, or Firm*—Cohen, Pontani, Lieberman, Pavane

[57] ABSTRACT

The invention concerns a method and a device for measurement of the nip force and/or nip pressure in a nip (N) formed by a revolving roll or a band used in the manufacture of paper. In the method and in the device, a series of measurement detectors ($20_1 \ldots 20_n$) is used, whose detectors (20) are placed across a considerable width of the paper web (W) in the transverse direction of the revolving roll (10) or the band. The measurement signals received from the different detectors (20) are passed to a switching unit (23), whose connectors ($24_1 \ldots 24_n$) are controlled so that, through the switching unit (23), the signal of each measurement detector ($20_1 \ldots 20_n$) is alternatingly connected to a telemeter transmitter (26) placed in connection with the revolving roll (10). By means of the telemeter transmitter (26), the series of measurement signals ($V_{in\,1} \ldots V_{in\,n}$) are transmitted wirelessly to a stationary telemeter receiver (27) placed outside the revolving roll (10).

15 Claims, 4 Drawing Sheets

METHOD AND DEVICE FOR MEASUREMENT OF THE NIP FORCE AND/OR NIP PRESSURE IN A NIP FORMED BY A REVOLVING ROLL OR A BAND THAT IS USED IN THE MANUFACTURE OF PAPER

The invention concerns a method for measurement of the nip force and/or nip pressure in a nip formed by a revolving roll or a band used in the manufacture of paper, in which method a series of measurement detectors are used, whose detectors are placed across a substantial width of the paper web in the transverse direction of the revolving roll or the band.

Further, the invention concerns a device for measurement of the nip force and/or nip pressure and of the distribution of same in a nip formed by a revolving roll or by a corresponding band used in the manufacture of paper, said device comprising a series of detectors placed in connection with the revolving roll or the band, whose measurement detectors are placed, preferably as evenly spaced, in the transverse direction of the roll or band.

In several stages in the manufacture of paper, various nips are employed through which the paper web is passed. Examples of these nips include the roll nips and so-called extended nips in the dewatering presses in paper machines, calendering nips, and the nips in paper winders. For example, in a dewatering press, the transverse distribution (in the axial direction of the nip rolls) of the nip pressure affects the transverse moisture profile of the web to be pressed.

It is known in prior art to employ press rolls consisting of variable-crown rolls or of so-called Küsters rolls, in which the transverse distribution of the linear load in the press nip can be controlled by means hydraulic loading members. As a rule, these members are regulated on the basis of the regulation signals transmitted by moisture and/or grammage detectors. However, in view of overall control and regulation of the process, it would also be extremely important to know the factual distributions of the nip pressure both in the transverse direction and in the machine direction. Also, a piece of information that is important for the control of the nip process is the width of the nip in the machine direction, on whose basis it is possible to optimize the pressing process. This information is also important for the adjustment of the nips in calenders and winders. As an example of the regulation system of press nips, reference is made to the applicant's FI Patent No. 76,872 (equivalent of U.S. Pat. No. 4,791,863), in which an example of an environment is described in which the measurement system of the present invention can be used.

Recently, various so-called extended-nip presses based on press shoes and/or bands have been suggested and introduced, in which the width of the press zone in the machine direction is substantially larger than in roll nips proper. Also in extended-nip presses, the distribution of the nip pressure in the shoe and/or band nips both in the machine direction and in the transverse direction is an important parameter in view of the control of the pressing process. As an example in respect of said extended-nip presses, reference is made to the applicant's FI Patent No. 82,092 (equivalent of U.S. Pat. No. 5,043,046).

In prior art, various carrier-drum reel-ups are known, in which, in addition to carrier drums, belt support units have also been used. In view of the reeling of a paper web, it is also important to know the distributions of the nip pressure both in the machine direction and in the transverse direction. As some examples of the reel-ups developed by the applicant in connection with which the method and the device of the present invention can be used, we refer to the applicant's FI Patents Nos. 81,768 and 81,770 (equivalents of U.S. Pat. Nos. 4,921,183 and 4,883,233).

By means of the prior-art methods and devices, during production operation, in practice, it has been almost impossible to measure the distribution of the nip force in the machine direction and in the transverse direction, which distribution is important in view of the regulation and control of the process of paper manufacture. Nip forces have been measured from a revolving roll under laboratory conditions, in which respect reference is made to the paper published in *Paperi ja Puu - Paper and Timber* 73(1991):5 by J. Koriseva, T. Kiema, and M. Tervonen, "Soft calender nip: An interesting subject for research and measurement". In the method described in said paper, a number of detectors have been mounted on the roll, each of which detectors requires a telemetry equipment of its own and an amplifier of its own. Since the weight of the measurement system consists mainly of the weight of the telemetry equipment (about 1 kg per channel), this, together with the high cost, imposes a limitation on the number of measurement channels and detectors in a factual roll in a paper machine or finishing machine. Moreover, in practice, owing to the limited space, it is very difficult to place a number of telemetry equipments on a revolving roll of a paper machine or finishing machine without changes in construction.

Moreover, in respect of the prior art related to the present invention, reference is made to the published international patent application WO 91/13337 (Beloit Corp.).

In the prior-art methods and devices for measurement of nip forces, problems have also been encountered in the calibration of the detectors and in the transfer of the signal from the revolving roll. In prior art, for the transfer of the signal, glide rings and equivalent arrangements have been used, and so also telemetry equipments, which are, however, complicated and susceptible to disturbance.

The object of the present invention is to provide a novel method and a novel device for measurement of the nip forces and nip pressures and of the distribution of same in roll and/or band nips that are used in the manufacture of paper so that the drawbacks discussed above can be substantially avoided.

It is a further object of the invention to provide a measurement method and device that is suitable for on-line measurement of nip forces and/or nip pressures during production operation.

It is a further object of the invention to provide a method and a device in which the transfer of the signals from the revolving roll is solved in a simpler and more economical way so that the method is suitable for an environment of paper manufacture, which is quite demanding in this respect.

It is a further object of the invention to provide a method and a device in which the problems related to the placing of the detectors on a nip roll or nip band are solved.

Another object of the invention is to provide a method and a device in which the calibration of the detectors is simpler and more accurate than in prior art.

It is a non-indispensable additional object of the invention to provide a measurement method and device in which, besides the nip forces and nip pressures, it is, when necessary, also possible to measure distributions of temperature in the rolls or bands that form the nip, which distributions are important process parameters especially in soft calendering nips.

In view of achieving the objectives stated above and those that will come out later, the method in accordance with the invention is mainly characterized in that the measurement signals received from the different detectors are passed to a switching unit, whose connectors are controlled so that, through the switching unit, the signal of each measurement detector is alternatingly connected to a telemeter transmitter placed in connection with the revolving roll or equivalent, and that, by means of said telemeter transmitter, the series of measurement signals are transmitted wirelessly to a stationary telemeter receiver placed outside the revolving roll or equivalent.

On the other hand, the device in accordance with the invention is mainly characterized in that the device comprises a switching unit fitted in connection with the revolving roll or the band, to which unit the signals received from the different measurement detectors are connected, that the device comprises a telemeter transmitter fitted in connection with the revolving roll or equivalent, to which transmitter the switching unit is fitted to connect the measurement signals of the detectors, and that the device comprises a telemeter receiver fitted at the proximity of the telemeter transmitter, said receiver being fitted to receive the series of measurement signals transmitted by the telemeter transmitter wirelessly.

In the following, the invention will be described in detail with reference to some exemplifying embodiments of the invention illustrated in the accompanying drawing, the invention being not confined to the details of said embodiments.

Figure 1:
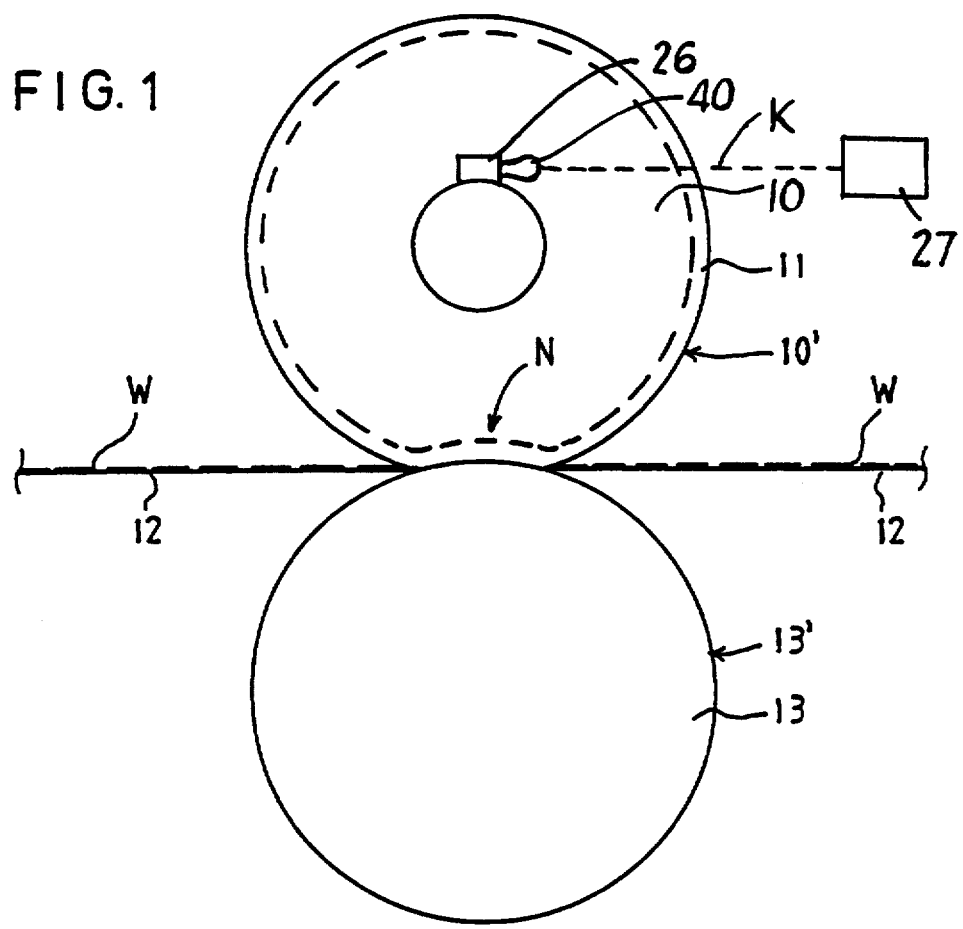
FIG. 1 is a schematic illustration of a press nip in which the invention can be applied.

FIG. 1 is a schematic illustration of a press nip N in a dewatering press, which nip is formed between the rolls 10 and 13. The web W that is dewatered is passed into the nip N on a press felt 12. The upper roll 10 has an elastic coating 11, which has a smooth outer face 10'. The lower roll 13 has a hollow face 13', into which water can escape out of the press felt 12.

Figure 2:
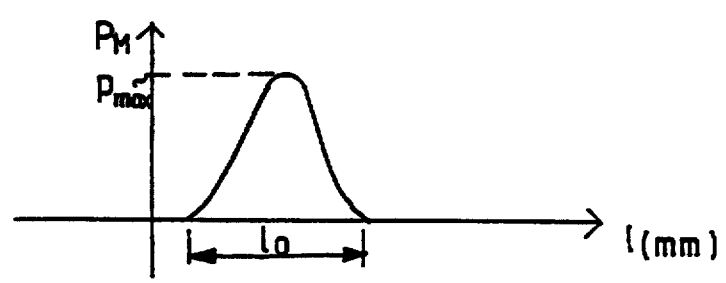
FIG. 2 is a schematic illustration of the distribution of the compression pressure in a press nip as shown in FIG. 1 in the machine direction.

FIG. 2 is a schematic illustration of the distribution of the compression pressure $p_M$ in the press nip N in the machine direction 1. The compression pressure $p_M$ has a peak value $p_{max}$. The nip N as shown in FIG. 1 may also represent a calendering nip, in which case, of course, no press felt 12 is used and in which case, e.g., the roll 13 is a hard-faced roll and the roll 10 is a calendering roll provided with a soft coating, e.g. a polyurethane coating 11, so that the nip N is a so-called soft calendering nip.

Figure 3:
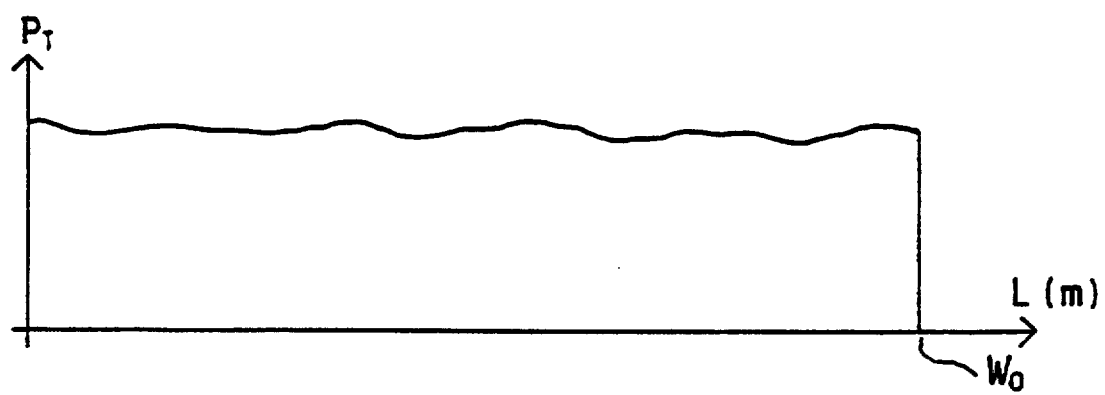
FIG. 3 is a schematic illustration of the distribution of the compression pressure in the transverse direction.

FIG. 3 illustrates the distribution of the compression pressure PT in the nip N in the transverse direction, i.e. in the axial direction of the rolls 10 and 13. The transverse width of the paper web W and of the nip N is denoted with $W_o$.

The transverse distribution of the compression pressure $p_T$ acts upon the dry solids content of the web in dewatering presses, upon the caliper and smoothness of the web in calendering nips, and upon the evenness and the hardness profile of the roll in winding nips. These are important process quantities, so that the distributions $p_M$ and $p_T$ of the nip forces and nip pressures are parameters important in view of the regulation and control of the process of paper manufacture.

Figure 4:
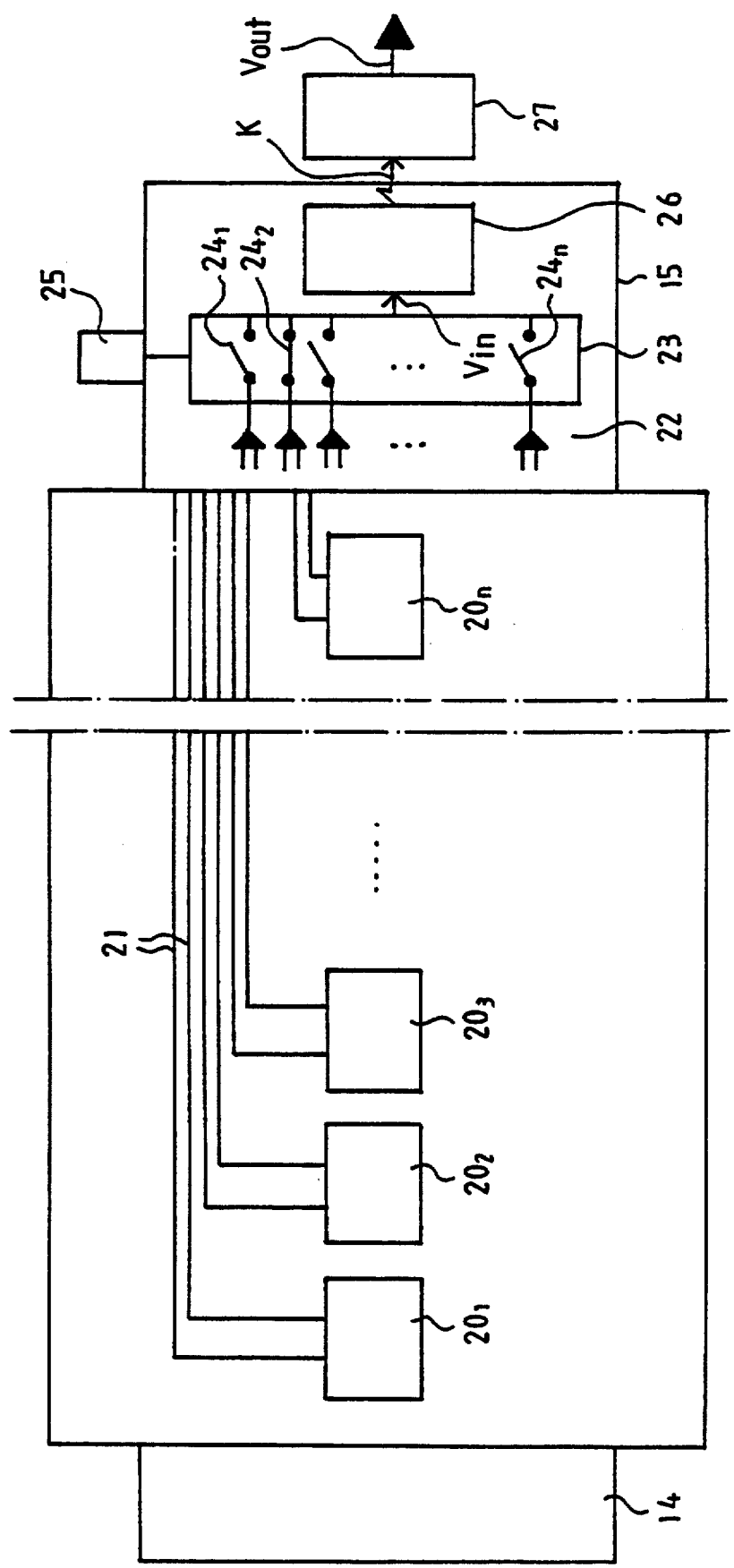
FIG. 4 is a schematic illustration of the main principle of the measurement arrangement in accordance with the invention, partly as a block diagram.

FIG. 4 is a schematic illustration of the main principles of the measurement arrangement in accordance with the invention. In the roll 10, which forms the press nip N and which is provided with an elastic coating 11, e.g. of polyurethane, inside the coating 11, a series 20 of measurement detectors $20_1 \ldots 20_n$ is fitted, the number of said detectors being, thus, n pieces. By means of the series 20 of detectors, both the distribution $p_M$ of the nip pressure in the machine direction and the distribution $p_r$ of the nip pressure in the transverse direction can be measured, at the latter point in the transverse direction. The detectors $20_1 \ldots 20_n$ are preferably evenly spaced, and their number is, as a rule, n=3 ... 20 pieces. The detectors 20 may be fixed either directly onto the roll 10 body or inside the coating 11, e.g. between its layers, or, in some exceptional cases, directly onto the outer face of the roll.

From the detectors 20, the measurement signals are passed along cables 21 to preamplifiers 22, each detector 20 having a preamplifier of its own. If the signals received from the detectors are of equal level, i.e. vary within the same voltage range, it is also possible to use only one preamplifier placed after the switching unit 23. By means of the preamplifiers 22, the signals are scaled to the desired voltage level, being passed to the switching unit 23. The switching unit 23 is controlled, on the basis of the rotation of the roll 10, by a pulse generator 25, and the switching unit 23 is controlled by means of a triggering signal obtained from said pulse generator 25 once during each revolution of the roll 10 so that, always, on arrival of the pulse, the connector $24_i$ that was closed is opened and the next connector $24_{i+1}$ is closed. In FIG. 4, the connector $24_2$ is closed and the other connectors 24 are open, so that the voltage signal of the detector $20_2$ is connected to the telemeter transmitter 26. The telemeter transmitter 26 is a radio transmitter, an optical transmitter, or another, corresponding radiating transmitter, whose signal T is passed wirelessly to the telemeter receiver 27. From the telemeter receiver 27, a series of output signals $V_{out}$ is obtained, which contains the measurement signal $V_{out\ i}$ (i=1 ... n) of each detector $20_i$ in a sequence. When the whole series of detectors $20_i$ has gone through, the next measurement sequence is started from the beginning. The connectors $24_i$ can also be controlled in some other ways, besides on the basis of the rotation of the roll 10.

It is an essential feature of the measurement arrangement described above that only one telemetry channel is needed, which simplifies the system substantially. The unit 15 placed in connection with the revolving roll 10, which unit comprises amplifiers 22, switching units 23, and a telemeter transmitter 26, can be accomplished as a battery-operated module of quite a small size, wherein, for example, the switching unit 23 is a standard microcircuit. The pulse generator 25 is preferably a photodetector provided with a filter, which detects, e.g., the intensity of an LED 40 that has a narrow beam and is located on, for example, the axle of the roll. The small-size measurement unit 15 with its battery is placed on the revolving roll 10, for example on its axle 14, preferably at the end of the axle.

The force or pressure detectors 20 used in the invention are preferably made of a PVDF film (PVDF=polyvinylidenedifluoride), which is a piezoelectric film. In respect of the properties and the functioning of this film, reference is made to the paper in the journal *Prosessori* 13/88, J. Koriseva, "Pietsosähköinen vaihtoehto" (Piezoelectric alternative). Films suitable for the purposes of the invention are. e.g., the PVDF films sold under the trade marks "SOLEF" and "KYNAR", whose thicknesses vary within the range of 8.. . 40 μm. A PVDF film is well suitable for a force or pressure detector especially because, by its means, an output voltage of the volt level is already obtained with a force of tens of newton.

Figure 5:
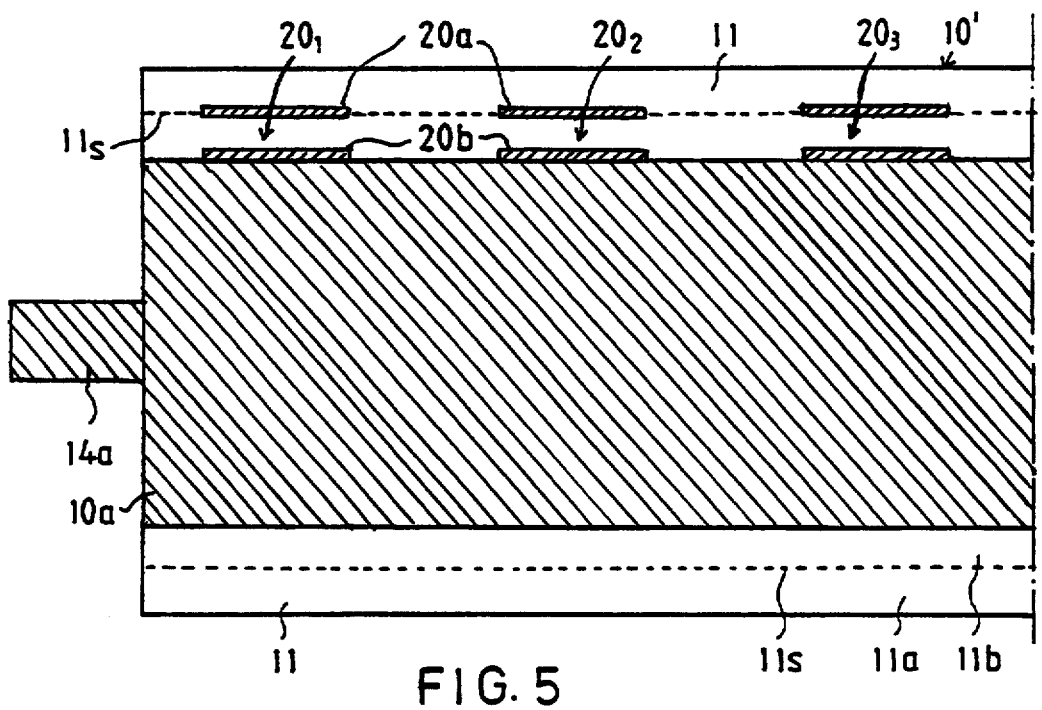
FIG. 5 is an axial sectional view of a press roll provided with an elastic coating and fitted with measurement detectors in accordance with the invention.

According to FIG. 5, the body part 10a of the roll 10, whose ends are provided with axle journals 14a, is provided with an elastic coating 11, e.g., of polyurethane. The coating 11 is composed of two layers 11a and 11b, which have been fixed one on top of the other, e.g., by means of a glue joint 11s. Onto the cylinder mantle of the roll frame 10a, film detectors 20b have been fixed by gluing, the number of said detectors being, in the way described above, n pieces as evenly spaced in the axial direction. Onto the cylinder mantle and the detectors, the lower layer 11b of the coating 11 has been attached. Onto the outer face 11b of the lower layer 11b, a second series of detectors 20a has been attached, and onto said layer and said detectors the outer layer 11a of the coating 11, which layer has a smooth outside face 10', which is placed in contact with the web W in the nip N. The detector series 20a and 20b are construction to each other. In practice, the alternative that can be controlled most easily is to place the detectors in accordance with the series 20b, i.e. directly on the roll body.

Figure 6:
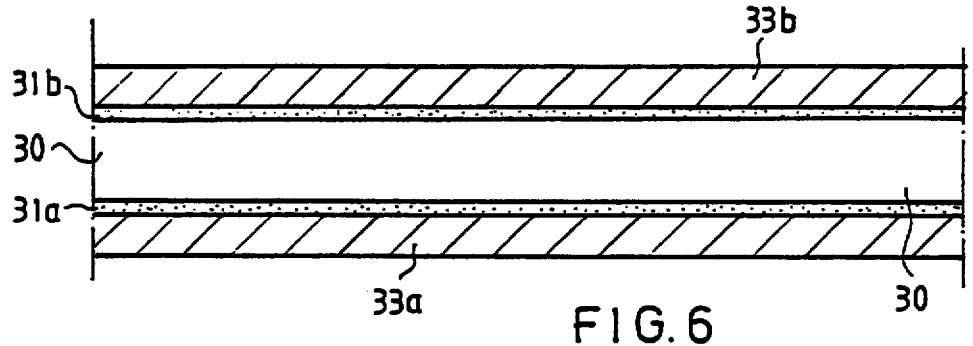
FIG. 6 is a sectional view of a detector made of a piezoelectric PVDF film.

FIG. 6 is a sectional view of an exemplifying embodiment of a preferred construction of a PVDF-film detector 20. The detector comprises a PVDF film 30, onto both of whose sides metallization patterns 31a, 31b of, e.g., aluminium have been applied. On the metallization patterns 31a,31b, there are layers 33a,33b of protective material, which are, e.g., of "Kapton" (" "=trade mark). FIG. 6 is a sectional view, e.g., in the radial plane of the detector arrangement shown in FIG. 7, which is made of a PVDF film 30 which is strip-shaped. The film strip 30 extends substantially across the entire axial length of the roll 10 mantle. It is also possible to accomplish the invention so that each detector 20 is manufactured and cabled separately, i.e. out of separate pieces of PVDF film. The areas of the metallization patterns 31 constitute the active areas of the detectors $20_l \ldots 20_n$, by whose means the compression forces are measured. The metallization patterns 31 are connected with strip conductors 32, which also consist of metallizations applied onto a film strip 30 in the way illustrated in FIG. 7. The strip conductors 32 constitute the cables $2_l \ldots 21_n$, which are placed preferably so that they arrive in the nip N at times different from the times of arrival of the active areas proper of the detectors. In such a case, the interference signals arising from deformations of the cables 21 can be filtered apart from the measurement signals.

Figure 8:
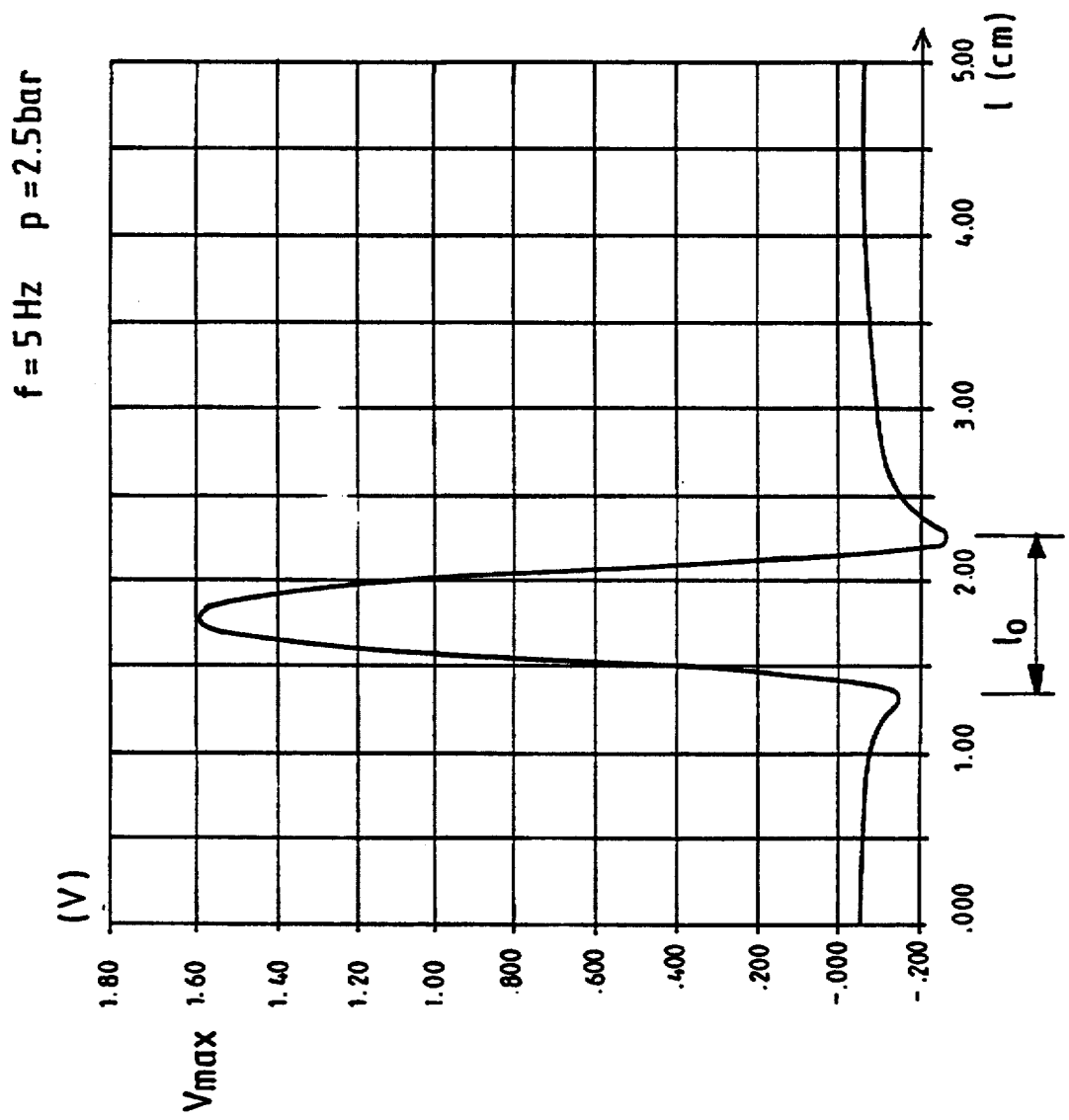
FIG. 8 illustrates an example of a voltage pulse given by the PVDF-film detectors.

The detectors 20 can be calibrated favourably by applying to them a precisely known force and by examining the response obtained, of which an example is given in FIG. 8, in which the horizontal axis represents the longitudinal direction 1 of the nip N, and the vertical axis represents the output voltage V of the detector as volts. The maximal pressure $p_{max}$ of the press nip N is proportional to the peak voltage $V_{max}$ of the pulse obtained from the detectors $20_i$. The length of the nip in the machine direction is proportional to the length of the pulse, but not necessarily directly proportional, for the interdependence may be non-linear. Moreover, the shape of the pressure distribution $p_M$ corresponds to the shape of the voltage pulse obtained from the detectors $20_i$, of which there is a typical example in FIG. 8 with respect to a roll nip N of a dewatering press. The transverse pressure distribution $p_r$ can be determined on the basis of the peak voltages $V_{max\ i}$ of the pulse series $V_{in\ i}$ obtained from the different detectors $20_i$.

Figure 7:
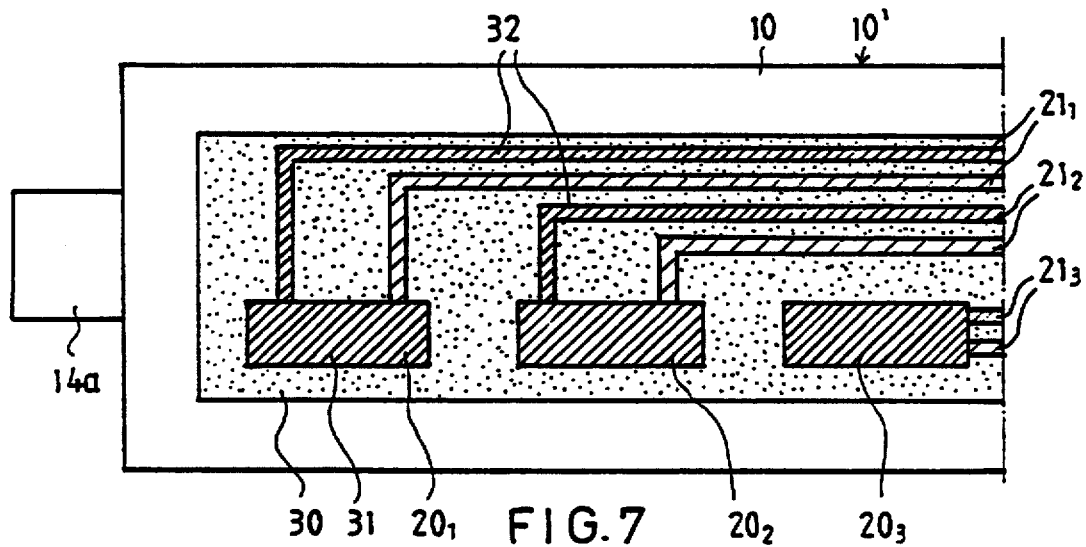
FIG. 7 illustrates the metallization patterning of the PVDF-film detectors.

Since, according to FIGS. 5, 6 and 7, being accomplished by means of a PVDF film the detectors $20_i$ are of small size, the calibration can also be carried out in practice.

A preferred exemplifying embodiment of the telemetry transmitter 26 and of the telemetry receiver 27 is shown in the FI Patent Application No. 914830 to be filed simultaneously with the present application, reference being made to said application in this respect.

A series of output signals $V_{out\ l} \ldots V_{out\ n}$ that is measured repeatedly is passed to suitable display devices, e.g. a display terminal, by whose means a graphic presentation is given of the distributions $p_M$ and $p_r$ of the compression pressure and possibly also of various parameters which are calculated on their basis and which are useful in the control and regulation of the process of paper manufacture. The measurement signals may also be connected to the regulation system of a paper machine or a finishing machine, such as a calender or a reel-up, to operate as feedback signals of a closed regulation system.

In the following, the patent claims will be given, and the various details of the invention may vary within the scope of the inventive idea defined in said claims and differ from what has been stated above for the sake of example only.

I claim:

1. Method for measuring the nip force and/or nip pressure in a nip (N) formed by a revolving roll or a band used in the manufacture of paper, the method comprising the steps of using a series of measurement detectors ($20_l \ldots 20_n$) that are polyvinylidenedifluoride-film detectors, placing the detectors on the roll in a straight line across a substantial width ($W_0$) of the paper web (W) in the transverse direction of the revolving roll or the band, passing the measurement signals received from the different detectors (20) to a switching unit (23) whose connectors ($24_l \ldots 24_n$) are controlled so that, through the switching unit (23), the signal of each measurement detector ($20_1 \ldots 20_n$) is alternatingly connected to a telemeter transmitter (26) placed in connection with the revolving roll 10 or equivalent, transmitting the series of measurement signals ($V_{in1} \ldots V_{inn}$) by means of said telemeter transmitter (26) wirelessly to a stationary telemeter receiver (27) placed outside the revolving roll (10), measuring the distributions of the compression pressure in the nip (N) in both the machine direction ($P_M$) and in the transverse direction ($P_T$) and, in the transverse direction, using n=3-20 measurement points and an equal number n of measurement detectors (20).

2. Method as claimed in claim 1, wherein the signal of a volt level obtained from said detectors is passed through the switching unit (23) to the telemeter transmitter (26).

3. Method as claimed in claim 1, wherein the detectors in the series of detectors ($20_1 \ldots 20_n$) are calibrated by applying to them a known force and by measuring the response obtained from the different detectors (20), in particular the height of the voltage pulse ($V_{max}$).

4. Method as claimed in claim 1 wherein said switching unit (23) is controlled on the basis of the rotation of the roll (10) or equivalent by means of a pulse generator (25) so that, by means of a triggering signal obtained during each revolution of the roll (10) or equivalent, the switching unit (23) is controlled so that, always, on arrival of the pulse, the connector ($24_i$) in the switching unit that was closed is opened and the next connector ($24_{i+1}$) is closed.

5. Method as claimed in claim 1 said connectors ($24_1 \ldots 24_n$) are controlled, based on the rotation of the roll (10) or equivalent, by means of a pulse generator (25).

6. Method for measuring the nip force and/or nip pressure in a nip (N) formed by a revolving roll or a band used in the manufacture of paper, the method comprising the steps of using a series of measurement detectors ($20_1 \ldots 20_n$) that are polyvinylidenedifluoride-film detectors, placing the detectors on the roll in a straight line across a substantial width ($W_0$) of the paper web (W) in the transverse direction of the revolving roll or the band, passing the measurement signals received from the different detectors (20) to a switching unit (23) whose connectors ($24_1 \ldots 24_n$) are controlled so that, through the switching unit (23), the signal of each measurement detector ($20_1 \ldots 20_n$) is alternatingly connected to a telemeter transmitter (26) placed in connection with the revolving roll (10) or equivalent, transmitting the series of measurement signals ($V_{in1} \ldots V_{inn}$) by means of said telemeter transmitter (26) wirelessly to a stationary telemeter receiver (27) placed outside the revolving roll (10), in addition to measuring the compression force or pressure in the nip (N) and/or the distribution or distributions ($P_M$, $P_T$) of said force or pressure, measuring the temperature or distribution of temperature of the roll (10) face or roll coating (11).

7. Method as claimed in claim 6, including passing the signal of a volt level obtained from said detectors through the switching unit (23) to the telemeter transmitter (26).

8. Method as claimed in claim 6, including calibrating the detectors in the series of detectors ($20_1 \ldots 20_n$) by applying to them a known/force and by measuring the response obtained from the different detectors (20), in particular the height of the voltage pulse ($V_{max}$).

9. Method as claimed in claim 6, including controlling said switching unit (23) on the basis of the rotation of the roll (10) or equivalent by means of a pulse generator (25) so that, by means or a triggering signal obtained during each revolution of the roll (10) or equivalent, the switching unit (23) is controlled so that, always, on arrival of the pulse, the connector ($24_i$) in the switching unit that was closed is opened and the next connector ($24_{i+1}$) is closed.

10. Method as claimed in claim 6, including controlling said connectors ($24_1 \ldots 24_n$), based on the rotation of the roll (10) or equivalent, by means of a pulse generator (25).

11. Device for measurement of the nip force and/or nip pressure of the distribution of same in a nip (N) formed by a revolving roll (10) or by a corresponding band used in the manufacture of paper, said device comprising a series of polyvinylidenedifluoride-film detectors ($20_1 \ldots 20_n$) placed on the revolving roll (10) or the band, which detectors (20) are placed in a straight line, preferably as evenly spaced, in the transverse direction of the roll (10) or band, wherein the device comprises a switching unit (23) fitted in connection with the revolving roll (10) or the band, to which unit the signals received from the different measurement detectors (20) are connected, the device further comprises a telemeter transmitter (26) fitted in connection with the revolving roll (10), to which transmitter the switching unit (23) is fitted to connect the measurement signals of the detectors (20), the device still further comprising a telemeter receiver (27) fitted at the proximity of the telemeter transmitter (26), said receiver being fitted to receive the series of measurement signals ($V_{in1} \ldots V_m$) transmitted by the telemeter transmitter (26) wirelessly, the series of detectors ($20_1 \ldots 20_n$) being composed of a unified, oblong polyvinylidenedifluoride-film strip (30) which has been extended at least a portion of the width ($W_0$) of the roll (10) or band, metallization patterns (31) being applied onto said polyvinylidenedifluoride-film strip, as active areas, by way of which the compression forces or pressures are measured, the metallization patterns (31) being connected by means of strip conductors (32) to the switching unit (23), said strip conductors (32) consisting of metallizations applied onto said film strip (30).

12. Device as claimed in claim 11, wherein the polyvinylidenedifluoride-film detectors are fitted in connection with the face or coating (11) of the revolving roll (10), and that the number of said film detectors in the transverse direction of the roll (10) or equivalent in n=3−20 pieces.

13. Device as claimed in claim 11, wherein the polyvinylidenedifluoride-film detectors are placed inside the elastic coating (11) of the revolving roll (10).

14. Device as claimed in claim 11 wherein in connection with the revolving roll (10), a compact battery-operated module of small size is fitted, which comprises amplifiers (22), switching units (23), and a telemeter transmitter (26), that the pulse generator (25) that controls the switching unit (23) is a photodetector provided with a filter, which detector detects the intensity of a LED or equivalent that has a narrow beam, and that said module with the battery is placed on the axle (14) of the revolving roll (10), preferably at the end of the axle.

15. Device as claimed in claim 11, and further comprising a pulse generator (25) or equivalent, which is fitted to detect the rotation of the roll (10) or equivalent and to control the connectors ($24_1 \ldots 24_n$) in the switching unit (23).

* * * * *